Patented Nov. 8, 1927.

1,648,263

UNITED STATES PATENT OFFICE.

JOHN G. G. FROST, OF CLEVELAND, OHIO, ASSIGNOR TO THE NATIONAL SMELTING COMPANY, OF CLEVELAND, OHIO, A CORPORATION OF OHIO.

PROCESS OF RECOVERING ALUMINUM FROM ALUMINUM SCREENINGS AND THE LIKE.

No Drawing. Application filed June 13, 1925. Serial No. 36,959.

My invention relates to a process of recovering aluminum compounds or alumina and other valuable and useful products from aluminous materials, and more particularly to recovering such aluminum compounds from skimmings, dross or analogous aluminous materials from aluminum foundries, aluminum smelters and the like.

In present practice the larger particles of metallic aluminum, or its alloys, and of iron or other metals are first removed from this material by any of the well known mechanical processes, such as passing the material over a magnet, screening it, etc. The residue from the screening operation in such separation comprises what may be termed for convenience "dross screenings" and this consists of the finely divided material from which all the metallic aluminum has been recovered that it is possible to recover on a commercial basis with present processes.

Such dross screenings consist mainly of fine particles of metallic aluminum or its alloys, metallic iron, oxides of aluminum, copper, iron, zinc and other metals, as well as nitrides, carbides and other miscellaneous compounds and metals, all of which have contributed to prevent successful recovery on a commercial basis of valuable products of aluminum and other valuable and useful products. Usually these dross screenings contain about 50% to 75% of aluminum content figured as aluminum oxide ($Al_2O_3$).

In carrying out my invention the dross screenings are preferably mixed with water and heated or boiled therewith, so that the finely divided particles are thoroughly wetted so that they do not cohere but are free to move independently in the water. The finely divided aluminum also reacts to some extent during this procedure to form aluminum hydroxide, and any foaming of the mixture of the dust and water takes place at this point rather than subsequently, when foaming would be more undesirable.

When the reaction with the water is completed the particles of iron are clean and are more susceptible to the action of a magnet. The mixture is then thoroughly agitated and subjected to the action of a strong magnet in any suitable manner to remove substantially all of the finely divided particles of magnetic iron remaining in the mixture.

After removal of the metallic iron, the mixture is then treated in a suitable vessel with sulphur dioxide, and this may be termed a sulphiting treatment, to put the zinc and iron contained in the mixture into solution as zinc and iron sulphites. The sulphiting reaction evolves some heat but it is preferable to keep the solution hot or keep it boiling and agitated to insure substantially all of the iron and zinc going into solution. Also, by keeping the solution hot, what aluminum is caused to go in solution as an aluminum sulphite of more or less complex composition is precipitated as aluminum hydroxide, thus freeing the sulphur dioxide for use in dissolving the iron and zinc.

It will thus be seen that considerably less sulphur dioxide is necessary to carry out this process than where the sulphur dioxide is used to form the aluminum sulphite and keep it in solution. While it is preferable to boil the solution to facilitate the desulphiting and precipitation of the aluminum to free the sulphur dioxide for attacking the iron and zinc, this reaction can be carried out at a lower temperature, if desired, if the solution be agitated vigorously.

There is usually a sufficient amount of metallic aluminum in the dross screenings to cause any copper which forms copper sulphite in this reaction to be deposited as metallic copper. When so deposited, the metallic copper does not react further with the sulphur dioxide to form further sulphites. Consequently the copper does not remain in solution if there be sufficient metallic aluminum present in the material being treated.

After the iron and zinc sulphites are in solution and the aluminum has been precipitated, the solution and the solid material are separated by decanting, filtering, or in any other suitable manner thus getting rid of the objectionable iron and zinc contents. The residue and the precipitate from this sulphiting reaction, which contain all of the original aluminum content of the screenings, may then be treated with concentrated sulphuric acid sufficient to form a spongy mass, in order to dissolve or sulphate the metallic aluminum and aluminum hydroxides and oxides present in the residue and precipitate. After this reaction has proceeded sufficiently to dissolve or sulphate substantially all the aluminum, the spongy mass is heated in a suitable vessel or retort to dissolve difficultly soluble portions of the aluminum content, for example, fused aluminum oxides, and to fume or drive off the excess sulphuric acid, after which the sulphated residue is heated or boiled with water and the aluminum sulphate is dissolved, and the liquid obtained from this solution will contain substantially all of the aluminum content of the dross screenings with only small amounts of iron or zinc or other objectionable sulphates. The solution is separated from the residue from the sulphating reaction by filtration, decantation, or in any other suitable manner.

If copper be present in the dross screenings, it will ordinarily also appear in the resultant sulphate solution, and can be readily removed therefrom by electrolysis to leave the solution of aluminum sulphate substantially pure. This is because there is usually enough metallic aluminum present in the dross screenings or similar material to precipitate any copper dissolved as a result of the sulphurous acid treatment. Such precipitated copper is subsequently dissolved together with the aluminum by the concentrated sulphuric acid.

It will be understood that the aluminum content of the screenings can be dissolved by other mineral acid solvents than sulphuric acid, in the manner disclosed herein, and the resulting solutions purified in a similar manner. Commercially, however, the use of concentrated sulphuric acid is preferred as the simplest and cheapest solvent.

Furthermore, it is to be understood that the particular compounds disclosed, and the procedure set forth, are presented for purposes of explanation and illustration and that various equivalents can be used and modifications of said procedure can be made without departing from my invention as defined in the appended claims.

What I claim is:

1. The method of recovering the aluminum content from dross screenings and the like which comprises, subjecting the screenings to treatment with sulphur dioxide and water, desulphiting the solution as to aluminum whereby to precipitate any aluminum in solution, separating the solution from the residue and precipitate, and dissolving the aluminum content of the residue and precipitate.

2. The method of recovering the aluminum content from dross screenings and the like which comprises, subjecting the screenings to treatment with sulphur dioxide, water and heat, whereby to dissolve substantially all the iron and zinc present in the screenings and to precipitate any dissolved aluminum, separating the solution containing the dissolved iron and zinc sulphites from the solid material, and treating the solid material with a mineral acid solvent to form an aluminum salt.

3. The method of recovering the aluminum content from dross screenings and the like which comprises, subjecting the screenings to treatment with sulphur dioxide and water and simultaneously agitating the mixture, whereby to dissolve substantially all the iron and zinc present in the screenings and to precipitate any dissolved aluminum, separating the solution containing the dissolved iron and zinc sulphites from the solid material, and treating the solid material with a mineral acid solvent to form an aluminum salt.

4. The method of recovering the aluminum content from dross screenings and the like which comprises, subjecting the screenings to treatment with sulphur dioxide, water and heat, whereby to dissolve substantially all the iron and zinc present in the screenings and to precipitate any dissolved aluminum, separating the solution containing the dissolved iron and zinc sulphites from the solid material, and treating the solid material with concentrated sulphuric acid to form aluminum sulphate.

5. The method of recovering the aluminum content from dross screenings and the like which comprises, subjecting the screenings to treatment with sulphur dioxide, water and heat, whereby to dissolve substantially all the iron and zinc present in the screenings and to precipitate any dissolved aluminum, separating the solution containing the dissolved iron and zinc sulphites from the solid material, treating the solid material with concentrated sulphuric acid to form aluminum sulphate, heating the mixture to complete the sulphating of the aluminum from the solid material, dissolving the aluminum sulphate, separating the aluminum sulphate solution from the solid material, and removing any copper sulphate present in the aluminum sulphate solution.

6. The method of recovering the aluminum content from dross screenings and the like which comprises, heating the screenings with water, removing substantially all the magnetic iron from the screenings, treating the substantially magnetic iron-free screenings with sulphur dioxide, water and heat, whereby to dissolve substantially all the iron and zinc present in the screenings and to precipitate any dissolved aluminum, separating the solution containing the dissolved iron and zinc sulphites from the solid material, and treating the solid material with a mineral acid solvent whereby to form an aluminum salt.

7. The method of recovering the aluminum content from dross screenings and the like which comprises, heating the screenings with water, removing substantially all the magnetic iron from the screenings, treating the substantially magnetic iron-free screenings with sulphur dioxide and water and simultaneously agitating the mixture, whereby to dissolve substantially all the iron and zinc present in the screenings and to precipitate any dissolved aluminum, separating the solution containing the dissolved iron and zinc sulphites from the solid material, and treating the solid material with a mineral acid solvent whereby to form an aluminum salt.

8. The method of recovering the aluminum content from dross screenings and the like which comprises, boiling the screenings with water, removing substantially all the magnetic iron from said screenings, treating the substantially magnetic iron-free screenings with sulphur dioxide and water and simultaneously boiling the mixture, whereby to dissolve the iron and zinc content of said screenings and to precipitate any dissolved aluminum, separating the solution from the solid material, treating the solid material with an acid capable of dissolving the aluminum content of the material, and separating the aluminum salt from the material.

In testimony whereof I hereunto affix my signature.

JOHN G. G. FROST.